United States Patent
Nakajima et al.

(10) Patent No.: US 10,208,698 B2
(45) Date of Patent: Feb. 19, 2019

(54) DIRECT FUEL INJECTION INTERNAL COMBUSTION ENGINE

(71) Applicant: HONDA MOTOR CO., LTD., Tokyo (JP)

(72) Inventors: Susumu Nakajima, Wako (JP); Naoki Yokoyama, Wako (JP); Kenji Hirose, Wako (JP); Seiichi Hosogai, Wako (JP); Hidekazu Hironobu, Wako (JP); Tatsuo Yamanaka, Wako (JP); Haruya Kitano, Wako (JP); Yasuhiro Okura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 15/431,904

(22) Filed: Feb. 14, 2017

(65) Prior Publication Data

US 2017/0241366 A1    Aug. 24, 2017

(30) Foreign Application Priority Data

Feb. 24, 2016   (JP) .................................. 2016-033433

(51) Int. Cl.
   *F02D 41/00*    (2006.01)
   *F02D 41/38*    (2006.01)
   (Continued)

(52) U.S. Cl.
   CPC ........ *F02D 41/3836* (2013.01); *F02B 17/005* (2013.01); *F02D 41/068* (2013.01);
   (Continued)

(58) Field of Classification Search
   CPC ............... F02D 41/3836; F02D 41/402; F02D 2041/0015; F02D 2200/0602;
   (Continued)

(56) References Cited

U.S. PATENT DOCUMENTS 5,720,253 A * 2/1998 Matoba ................. F02B 23/104
                                                                   123/298
6,138,639 A * 10/2000 Hiraya ...................... F01L 3/06
                                                                   123/295
(Continued)

FOREIGN PATENT DOCUMENTS

DE    102 42 227 A1    3/2004
DE    601 21 879 T2    1/2007
(Continued)

OTHER PUBLICATIONS

Office Action dated Jul. 25, 2017, issued in counterpart Japanese Application No. 2016-033433. (10 pages).
(Continued)

*Primary Examiner* — Hieu T Vo
*Assistant Examiner* — Sherman Manley
(74) *Attorney, Agent, or Firm* — Westerman, Hattori, Daniels & Adrian, LLP

(57) ABSTRACT

A direct fuel injection internal combustion engine having an injector for directly injecting fuel into a combustion chamber thereof is provided. The engine is configured so that a tumble flow is generated in the combustion chamber. A fuel injection by the injector can be performed in a first injection mode and a second injection mode, the first injection mode being a mode in which the fuel injection is completed after the tumble flow is generated, and the second injection mode being a mode in which the fuel injection is completed before the tumble flow is generated. The fuel injection of the first injection mode is performed before completion of the warming-up of the engine, and the fuel injection of the second injection mode is performed after completion of the warming-up of the engine.

16 Claims, 6 Drawing Sheets

(51) Int. Cl.
  *F02B 17/00* (2006.01)
  *F02M 61/14* (2006.01)
  *F02D 41/06* (2006.01)
  *F02D 41/40* (2006.01)

(52) U.S. Cl.
  CPC ....... *F02D 41/3845* (2013.01); *F02D 41/401* (2013.01); *F02D 41/402* (2013.01); *F02M 61/14* (2013.01); *F02D 2041/0015* (2013.01); *F02D 2041/389* (2013.01); *F02D 2200/0602* (2013.01); *Y02T 10/44* (2013.01)

(58) Field of Classification Search
  CPC .. F02D 41/401; F02D 41/3845; F02D 41/068; F02D 41/0015; F02M 61/14; F02B 17/005; Y02T 10/44
  See application file for complete search history.

(56) References Cited

U.S. PATENT DOCUMENTS

| | | | | |
|---|---|---|---|---|
| 2002/0088428 A1* | 7/2002 | Abo | ...................... | F02B 23/104 |
| | | | | 123/295 |
| 2002/0134346 A1* | 9/2002 | Yamauchi | ............. | F02B 23/104 |
| | | | | 123/295 |
| 2004/0163379 A1* | 8/2004 | Pott | ......................... | F02D 37/02 |
| | | | | 60/284 |
| 2006/0102141 A1* | 5/2006 | Nakayama | ............ | F02B 23/104 |
| | | | | 123/298 |
| 2008/0196696 A1* | 8/2008 | Storhok | ................ | F02D 41/064 |
| | | | | 123/491 |
| 2008/0208438 A1* | 8/2008 | Sukegawa | ............. | F02D 41/047 |
| | | | | 701/105 |
| 2011/0246048 A1 | 10/2011 | Fujii et al. | | |
| 2012/0185152 A1 | 7/2012 | Shibata et al. | | |
| 2016/0258345 A1* | 9/2016 | Kimura | .................. | F02D 41/402 |
| 2016/0298586 A1* | 10/2016 | Kimura | .................. | F02M 59/22 |

FOREIGN PATENT DOCUMENTS

| | | |
|---|---|---|
| DE | 10 2013 214 261 A1 | 1/2015 |
| JP | 2009-174440 A | 8/2009 |
| JP | 2011-157832 A | 8/2011 |
| JP | 2014-77421 A | 5/2014 |
| JP | 2014-173464 A | 9/2014 |

OTHER PUBLICATIONS

Office Action and Search Report dated Jul. 18, 2017, issued in counterpart German Application No. 10 2017 202 830.0, with English translation. (23 pages).

\* cited by examiner

DIRECT FUEL INJECTION INTERNAL COMBUSTION ENGINE

BACKGROUND OF THE INVENTION

Field of the Invention

The present invention relates to a direct fuel injection internal combustion engine having an injector for directly injecting fuel into a combustion chamber thereof, and particularly to the internal combustion engine which is configured so that a tumble flow is generated in the combustion chamber.

Description of the Related Art

Japanese Patent Laid-open Publication No. 2014-77421 (JP'421) discloses a direct fuel injection internal combustion engine in which divided fuel injections are performed in the intake stroke. The divided fuel injections are performed for the purpose of mainly reducing a soot amount (an amount of particulate matter) in the exhaust gases. Specifically, JP'421 describes the controls described below: a control in which the completion timing of the divided fuel injections in the intake stroke is advanced after completion of the warming-up of the engine, a control in which the first injection timing in the intake stroke is advanced as the engine rotational speed increases (FIG. 4 of JP'421), a control in which the number of the divided fuel injections is reduced as the engine rotational speed increases (FIG. 5 of JP'421), a control in which the fuel pressure is increased when the demand fuel amount cannot be injected with a single injection, and the like.

In the engine which is configured so that the tumble flow is generated in the combustion chamber, a fuel adhering state indicating how the injected fuel adheres to the inner wall of the combustion chamber or to the top surface of the piston (upper surface of the piston defining the combustion chamber), changes depending on whether the fuel injection is performed before generation of the tumble flow or after generation of the tumble flow. However, this point is not considered in the direct fuel injection internal combustion engine shown in JP'421.

SUMMARY OF THE INVENTION

The present invention was made contemplating the above-described point, and an objective of the present invention is to provide a direct fuel injection internal combustion engine in which the fuel injection is performed with consideration of the fuel adhesion caused by generation of the tumble flow, thereby making it possible to effectively reduce the soot amount in the exhaust gases not only before completion of the engine warming-up but also after completion of the engine warning-up.

To attain the above objective, the present invention provides a direct fuel injection internal combustion engine which has an injector (7) for directly injecting fuel into a combustion chamber (6a) thereof, and is configured so that a tumble flow is generated in the combustion chamber. In this engine, fuel injection by the injector (7) can be performed in a first injection mode and a second injection mode, the first injection mode being a mode in which the fuel injection is completed after the tumble flow is generated, and the second injection mode being a mode in which the fuel injection is completed before the tumble flow is generated. Further, the fuel injection of the first injection mode is performed before completion of the warming-up of the engine, and the fuel injection of the second injection mode is performed after completion of the warming-up of the engine.

With this configuration, before completion of the warming-up of the engine, the fuel injection of the first injection mode is performed, wherein the fuel injection by the injector is completed after generation of the tumble flow. On the other hand, after completion of the warming-up of the engine, the fuel injection of the second injection mode is performed, wherein the fuel injection by the injector is completed before generation of the tumble flow. Before completion of the warming-up, fuel adhesion to the piston top surface is the main factor for generating soot. Accordingly, employing the first injection mode makes it possible to reduce an amount of fuel adhered to the piston top surface, thereby effectively suppressing the generation of soot.

After completion of the warming-up, fuel adhesion to the cylinder wall near a position (injector-mounted position) at which the injector is mounted, is the main factor for generating soot. Accordingly, employing the second injection mode makes it possible to reduce an amount of fuel adhered to the cylinder wall near the injector-mounted position, thereby effectively suppressing the generation of soot. Consequently, an amount of soot contained in the exhaust gases can effectively be reduced not only before completion of the warming-up but also after completion of the warming-up.

Preferably, the fuel injection of the second injection mode is performed after completion of the warming-up of the engine and in a high rotational speed operating condition where the rotational speed (NE) of the engine is comparatively high (NE≥NE2).

With this configuration, the second injection mode is used after completion of the warming-up and in the high rotational speed condition where the rotational speed of the engine is comparatively high. Since strength (flow rate) of the tumble flow becomes higher in the high rotational speed condition, employing the second injection mode makes it possible to obtain good effect for reducing the soot amount.

Preferably, the fuel injection of the first injection mode comprises three-divided injections which are performed within a predetermined angular period (CA3DI) of which the center is the bottom dead center at which the intake stroke ends. In other words, the fuel injection of the first injection mode is performed as three-divided injections.

In this specification, the bottom dead center at which the intake stroke ends is hereinafter referred to as "intake stroke end BDC".

With this configuration, the fuel injection of the first injection mode is performed as the three-divided injections within the predetermined angular period of which the center is a timing at which the piston is located at the bottom dead center, i.e., the remotest position from the injector. By employing the three-divided injections and performing the three-divided injections within the predetermined angular period of which the center is the intake stroke end BDC, an amount of fuel adhered to the piston top surface can be suppressed to effectively reduce the soot amount. Further, performing the three-divided injections makes it possible to homogenize the air-fuel mixture to enhance combustion stability.

Preferably, a pressure (PF11) of fuel supplied to the injector (7) in the first injection mode is set to a pressure which is lower than a pressure (PF12) of the fuel in the second injection mode.

With this configuration, it is possible to effectively reduce the penetration of the injected fuel as well as to expand the engine operating region where the three-divided injections can be performed, toward the low load side.

Preferably, the fuel injection of the second injection mode is a single injection.

With this configuration, the fuel injection can surely be completed before generation of the tumble flow, to effectively reduce an amount of fuel adhered to the cylinder wall near the injector-mounted position.

DETAILED DESCRIPTION OF THE PREFERRED EMBODIMENTS

Figure 1:
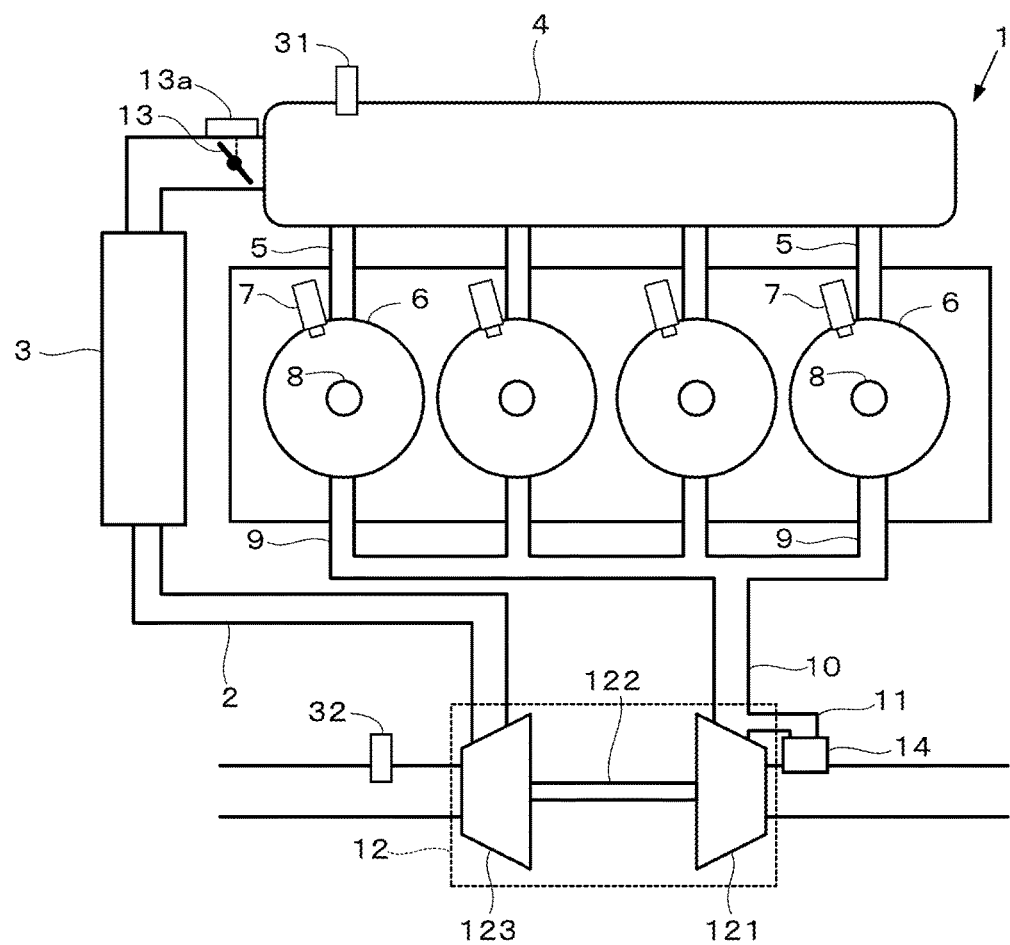
FIG. 1 schematically shows a configuration of a direct fuel injection internal combustion engine according to one embodiment of the present invention.
Figure 2:
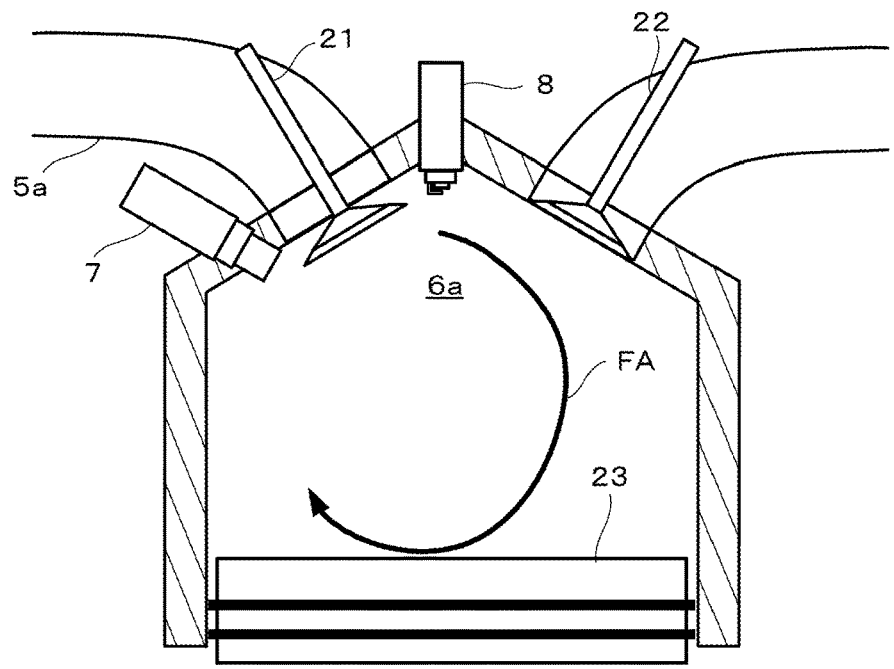
FIG. 2 schematically shows a configuration of a cylinder of the internal combustion engine shown in FIG. 1.

Preferred embodiments of the present invention will now be described with reference to the drawings. FIG. 1 shows a configuration of a direct fuel injection internal combustion engine (hereinafter referred to as "engine") according to one embodiment of the present invention. FIG. 2 schematically shows a configuration of a cylinder of the engine 1 shown in FIG. 1. The engine 1 has four cylinders 6, and fuel is injected into a combustion chamber 6a of the cylinder 6. Each cylinder 6 is provided with an injector 7, an ignition plug 8, an intake valve 21, an exhaust valve 22, and a piston 23. The injector 7 is mounted in the vicinity of the intake valve 21 so that fuel is injected diagonally downward in the combustion chamber 6a.

The engine 1 is provided with an intake passage 2, an exhaust passage 10, and a turbocharger 12. The intake passage 2 is connected to a surge tank 4, and the surge tank 4 is connected via an intake manifold 5 to the combustion chamber 6a of each cylinder 6. The intake passage is provided with a throttle valve 13 and an intercooler 3 for cooling pressurized air. The throttle valve 13 is configured so as to be actuated by a throttle actuator 13a. The surge tank 4 is provided with an intake pressure sensor 31 for detecting an intake pressure PBA, and the intake passage 2 is provided with an intake air flow rate sensor 32 for detecting an intake air flow rate GAIR.

The turbocharger 12 is provided with a turbine 121 and a compressor 124 connected via a shaft 122 to the turbine 121. The turbine 121 is rotationally driven by kinetic energy of the exhaust gases. The compressor 123 is mounted on the intake passage 2 and pressurizes (compresses) air sucked into the engine 1.

The combustion chamber 6a of each cylinder 6 of the engine 1 is connected via an exhaust manifold 9 to the exhaust passage 10. A bypass passage 11 bypassing the turbine 121 is connected to the exhaust passage 10, and the bypass passage 11 is provided with a waste gate valve (hereinafter referred to as "WG valve") 14 for controlling a flow rate of the exhaust gases passing through the bypass passage 11.

The engine 1 is configured so that a tumble flow FA is generated in the combustion chamber 6a by the inflowing air through the intake port 5a and the intake valve 21 into the combustion chamber 6a. The strength (flow rate) of the tumble flow FA increases in the operating condition where the intake pressure is boosted by the turbocharger 12.

Figure 3:
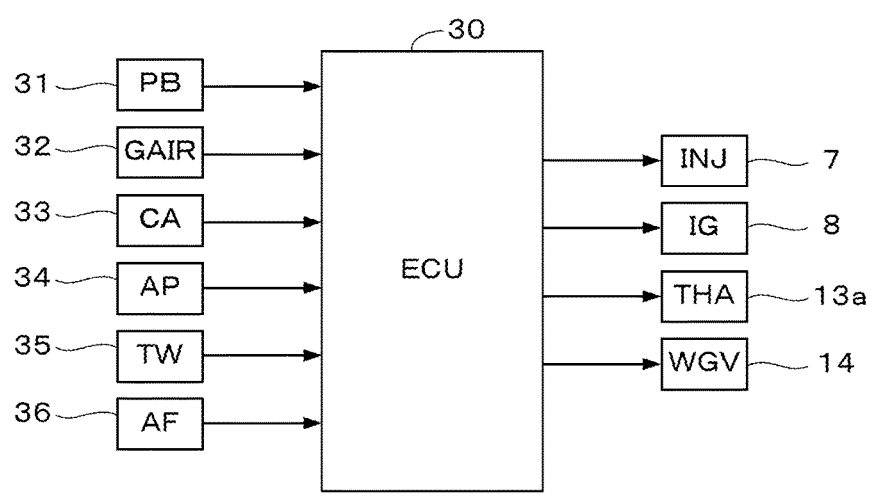
FIG. 3 is a block diagram showing a configuration of a control system for controlling the internal combustion engine shown in FIG. 1.

FIG. 3 is a block diagram showing a configuration of a control system for controlling the engine 1. The intake pressure sensor 31 and the intake air flow rate sensor 32 are connected to an electronic control unit (hereinafter referred to as "ECU") 30. Further, a crank angle sensor 33, an accelerator sensor 34, a coolant temperature sensor 35, an air-fuel ratio sensor 36, and other sensors (not shown) are connected to the ECU 30, and the detection signals from these sensors are supplied to the ECU 30. The crank angle sensor 33 detects a rotation angle (crank angle) CA of the crankshaft of the engine 1, the accelerator sensor 34 detects a depression amount AP of the accelerator pedal (not shown) of the vehicle driven by the engine 1, and the coolant temperature sensor 35 detects an engine coolant temperature TW. The output terminals of the ECU 30 are connected to the injector 7, the ignition plug 8, the throttle actuator 13a, and the WG valve 14. Various timings such as the fuel injection timing and the ignition timing are controlled and an engine rotational speed NE is calculated based on the detection output from the crank angle sensor 33.

The ECU 30 performs a fuel injection control with the injector 7, an ignition control with the ignition plug 8, a turbine drive control with the WG valve 14, and an intake air amount control with the throttle valve 13, according to an operating condition of the engine 1. These controls are performed according mainly to the engine rotational speed NE and a demand torque TRQD. The demand torque TRQD is calculated depending mainly on the accelerator pedal operation amount AP so as to increase as the accelerator pedal operation amount AP increases.

An amount of fuel injected by the injector 7 (fuel injection amount QINJ) is controlled by correcting a basic fuel amount with an air-fuel ratio correction coefficient KAF, wherein the basic fuel amount is calculated according to the intake air flow rate GAIR, and the air-fuel ratio correction coefficient KAF is calculated according to an air-fuel ratio AF detected by the air-fuel ratio sensor 36 so that the detected air-fuel ratio AF coincides with a target air-fuel ratio AFCMD.

Figure 4A:
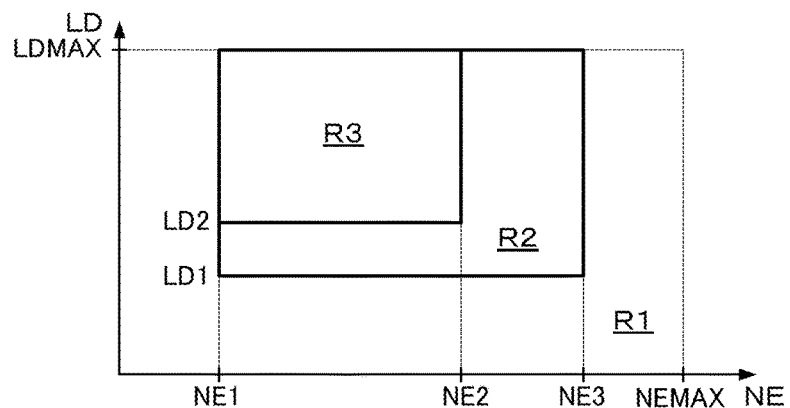
FIGS. 4A and 4B show drawings for explaining how the number of fuel injections in one combustion cycle is set.
Figure 4B:
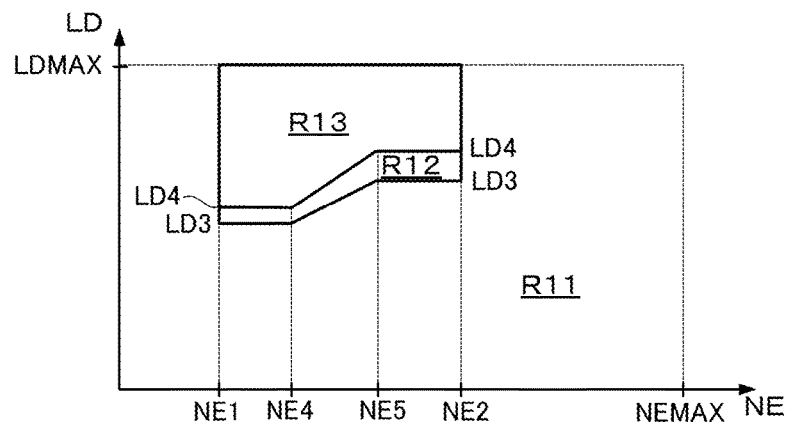

FIGS. 4A and 4B are drawings for explaining how the number of fuel injections in one combustion cycle (hereinafter referred to as "fuel injection number NINJ) is set, which show engine operating regions defined by the engine rotational speed NE and an engine load parameter LD. FIG. 4A corresponds to an engine operating condition where the engine coolant temperature TW is lower than a predetermined temperature TWTH (e.g., 60 degrees centigrade)

before completion of the warming-up of the engine 1. FIG. 4B corresponds to an engine operating condition where the warming-up of the engine 1 is completed (TW is equal to or higher than 75 degrees centigrade). The intake air flow rate GAIR or the intake pressure PBA is, for example, used as the engine load parameter LD.

When the temperature of the engine 1 is comparatively low, the fuel injection number NINJ is set to "3" in the region R3. In the regions R2 and R1, the fuel injection number NINJ is respectively set to "2" and "1". The region R3 of FIG. 4A is a low speed high load region where the engine rotational speed NE is equal to or higher than a first rotational speed NE1 and lower than a second rotational speed NE2, and the engine load parameter LD is equal to or greater than a second boundary load LD2 and equal to or less than the maximum load LDMAX. The first engine rotational speed NE1 corresponds to an idling rotational speed of the engine 1.

The region R2 comprises a low speed medium load region and a medium speed medium/high load region. In the low speed medium load region, the engine rotational speed NE is equal to or higher than the first rotational speed NE1 and lower than the second rotational speed NE2, and the engine load parameter LD is equal to or greater than a first boundary load LD1 and less than the second boundary load LD2. In the medium speed medium/high load region, the engine rotational speed NE is equal to or higher than the second rotational speed NE2 and lower than a third rotational speed NE3, and the engine load parameter LD is equal to or greater than the first boundary load LD1 and equal to or less than the maximum load LDMAX. The region RI comprises a low load region and a high speed region other than the regions R2 and R3. NEMAX shown in FIGS. 4A and 4B indicates the maximum rotational speed. The second rotational speed NE2 is set, for example, to a rotational speed which is about half of the maximum rotational speed NEMAX. The second boundary load LD2 is set to the minimum load in the range where three-divided injections can be performed.

After completion of the warming-up of the engine 1, the fuel injection number NINJ is set to "3", "2", and "1" respectively in the regions R13, R12, and R11 shown in FIG. 4B. The region R13 is a low speed high load region where the engine rotational speed NE is equal to or higher than the first rotational speed NE1 and lower than the second rotational speed NE2, and the engine load parameter LD is equal to or greater than a fourth boundary load LD4 and equal to or less than the maximum load LDMAX. The region R12 is a medium speed medium load region where the engine rotational speed NE is equal to or higher than the first rotational speed NE1 and lower than the second rotational speed NE2, and the engine load parameter LD is equal to or greater than a third boundary load LD3 and less than the fourth boundary load LD4.

It is to be noted that the third and fourth boundary load LD3 and LD4 are set so as to increase as the engine rotational speed NE increases from a fourth rotational speed NE4 to a fifth rotational speed NE5. The region R11 comprises a low load region and a medium/high speed region other than the regions R12 and R13. The boundary loads LD1-LD4 are set so as to satisfy the relationships of LD1<LD3 and LD2<LD4.

Figure 5A:
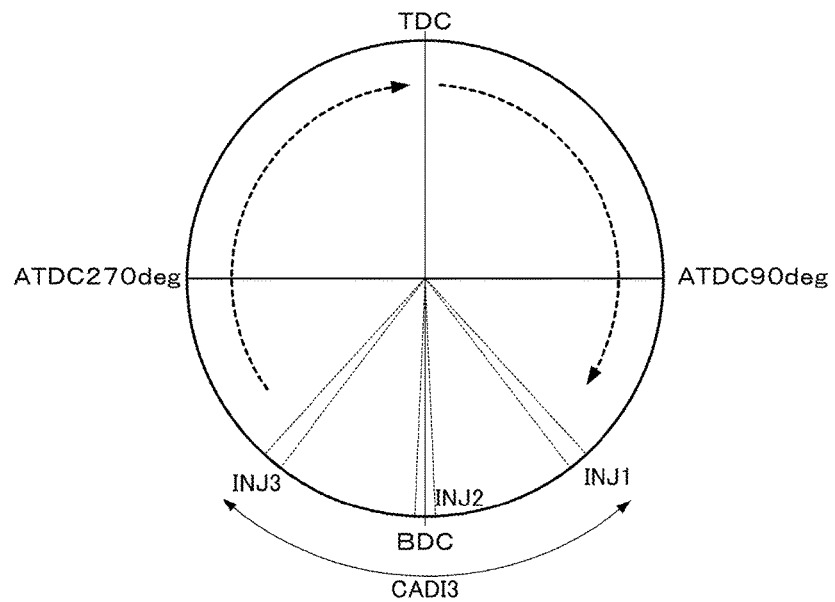
FIGS. 5A and 5B show drawings for explaining execution timings of the fuel injection.

In this embodiment, the fuel injection of the first injection mode is performed in the low speed high load region R3 when the temperature of the engine 1 is comparatively low (before completion of the warming-up). In the first injection mode, as shown in FIG. 5A, three injections (three-divided injections) INJ1, INJ2, and INJ3 are performed within a predetermined angular period CA3DI of which the center is the intake stroke end BDC after generation of the tumble flow FA. The amount of fuel injected in each of the three-divided injections INJ1, INJ2, and INJ3 is equal to an amount obtained by dividing the required fuel injection amount QINJ by "3". The predetermined angular period CA3DI is set to an angular period obtained by doubling an execution angular interval DCA which is an interval between the three-divided injections, when the execution angular interval DCA is set to the minimum angular interval. For example, the predetermined angular period CA3DI is set to an angular period from ATDC 130 deg. to ATDC 230 deg. It is to be noted that "ATDC" shown in FIGS. 5A and 5B means "after the top dead center at which the intake stroke starts".

In the vicinity of the intake stroke end BDC, the tumble flow FA is already been generated. However, by performing the three-divided injections, a time period of one fuel injection is shortened, and the penetration of the injected fuel decreases (the maximum reachable distance decreases). In addition, the piston 23 is positioned remotest from the injector 7 in the vicinity of the intake stroke end BDC. Accordingly, it is possible to reduce an amount of fuel adhered to the piston top surface, thereby effectively suppressing the generation of soot (suppressing the soot amount in the exhaust gases). If a single injection is performed in the vicinity of the intake stroke end BDC to inject all of the required fuel injection amount QINJ with one injection, homogeneity of the air-fuel ratio in the combustion chamber 6a is reduced. In contrast, performing the three-divided injections makes it possible to obtain good homogeneity of the air-fuel ratio.

Figure 5B:
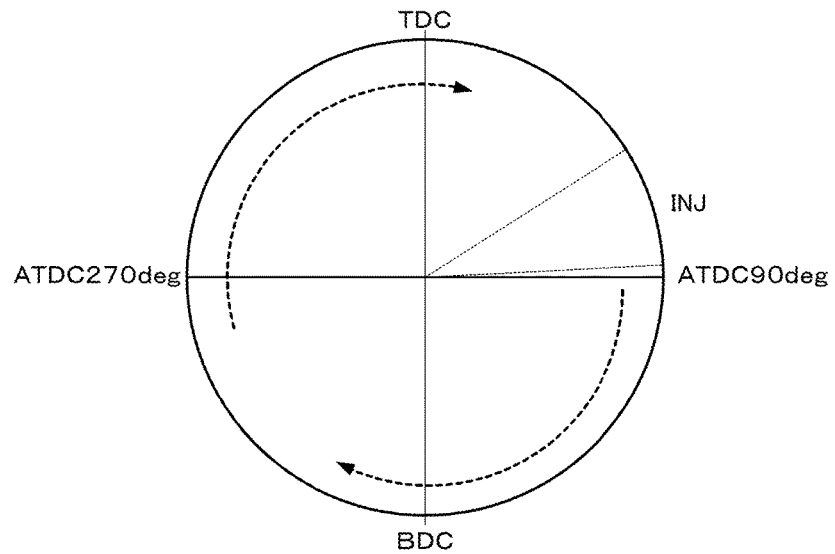

After completion of the warming-up of the engine 1, the fuel injection of the second injection mode is performed in the high rotational speed region within the region R11 shown in FIG. 4B, where the engine rotational speed NE is equal to or higher than the second rotational speed NE2. In the second injection mode, as shown in FIG. 5B, the single injection for injecting all of the required fuel injection amount QINJ is performed in the first half of the intake stroke before generation of the tumble flow FA. For surely completing the fuel injection before generation of the tumble flow FA, it is effective to increase the initial velocity of the injected fuel.

Accordingly, in this embodiment, a pressure of fuel supplied to the injector 7 (fuel pressure PF) is set to a comparatively high pressure (e.g., about 20 MPa) in the second injection mode, while the fuel pressure PF in the first injection mode is set to a value of about one-fourth of the fuel pressure in the second injection mode. Reducing the fuel pressure PF makes it possible to effectively reduce the penetration of the injected fuel as well as to expand the engine operating region where the three-divided injections can be performed, toward the low load side. The fuel injection time period which is a valve opening time period of the injector 7, cannot be set to a value less than the minimum valve opening time period determined by the specification of the injector 7. If the fuel pressure is high, an amount of fuel injected by one injection becomes larger, which disables performing the three-divided injections, since the actual fuel injection amount becomes excessively large if the three-dived injections are performed.

It is confirmed that when the temperature of the engine I rises after completion of the warming-up, a generation amount of soot due to the fuel adhered to the piston top surface decreases, and a generation amount of soot due to the fuel adhered to the cylinder wall near the injector 7 increases, since a part of the injected fuel is returned to adhere to the cylinder wall near the injector 7 by the rising flow of the tumble flow FA generated in the combustion chamber 6a. Accordingly, in the high speed operating condition of the engine 1 where the flow rate of the tumble flow FA becomes higher, the single injection is performed in the first half of the intake stroke before generation of the tumble flow FA, thereby reducing the soot generation amount.

Figure 6:
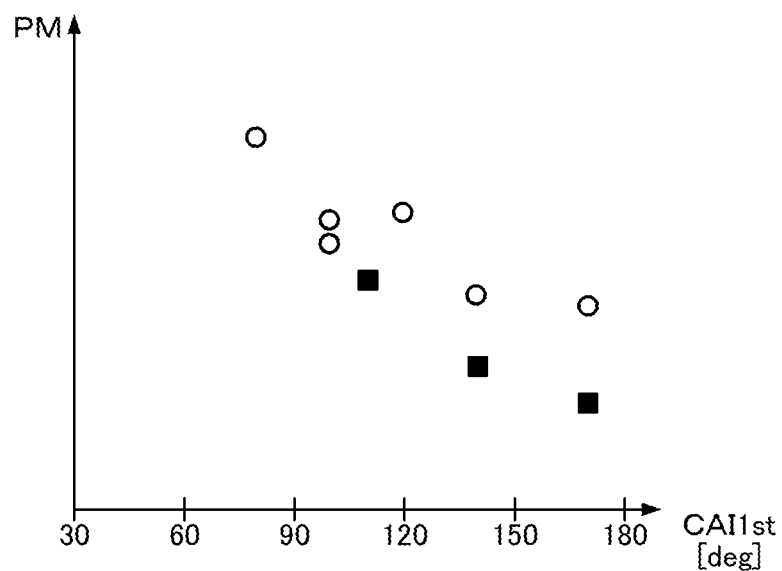
FIG. 6 is a drawing for explaining an effect of reducing the soot amount obtained by performing the three-divided injections.

FIG. 6 is a drawing for explaining an effect of reducing the soot amount, obtained by performing the three-divided injections. In FIG. 6, the symbols of "o" indicate data corresponding to the case where the single injection is performed, and the symbols of "■" indicate data corresponding to the case where the three-divided injections described above are performed. PM of the vertical axis in FIG. 6 indicates an amount of soot in the exhaust gases (hereinafter referred to as "soot amount PM"). The soot amount PM is defined as an amount of soot discharged when the vehicle driven by the engine 1 runs a constant distance. CAI1st of the horizontal axis indicates the execution timing of the single injection, or the execution timing of the first injection INJ1 for the three-divided injections. The angle of the horizontal axis indicates an angle after the top dead center at which the intake stroke starts. It is to be noted that the data of the three-divided injections shown in FIG. 6 are obtained by performing the second injection INJ2 at an angle of 40 deg. after the first injection timing CAI1 and performing the third injection INJ3 at an angle of 40 deg. after the execution timing of the second injection INJ2.

It is confirmed from FIG. 6 that the soot amount PM decreases as the fuel injection timing is retarded in the intake stroke, and the soot amount PM of the three-divided injections is less than that of the single injection.

Figure 7:
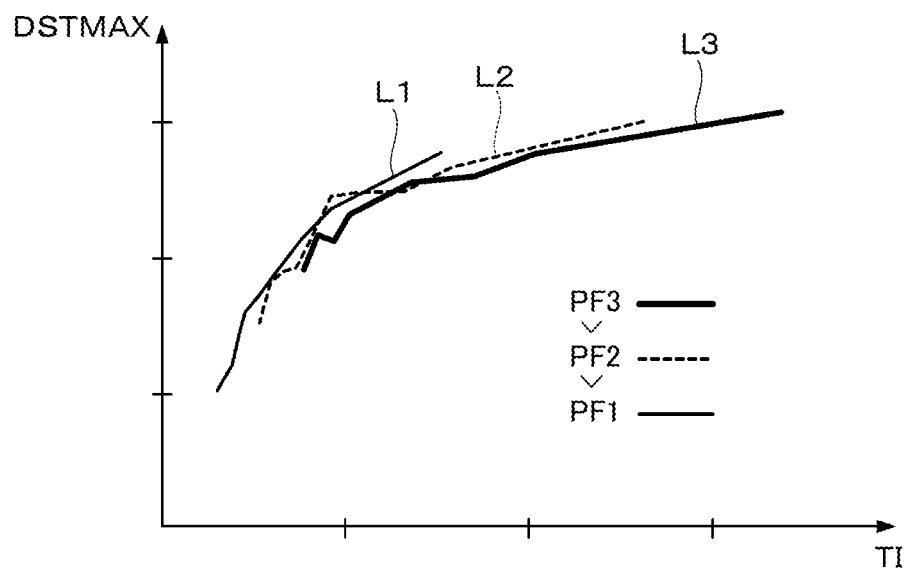
FIG. 7 shows relationships between a fuel injection time period (TI) which is a valve opening time period of the injector and a maximum reachable distance (DSTMAX) of the injected fuel.

FIG. 7 shows relationships between a fuel injection time period TI which is a valve opening time period of the injector 7 and the maximum reachable distance DSTMAX of the injected fuel. In FIG. 7, the thin solid line L1, the broken line L2, and the thick solid line L3 respectively correspond to the cases where the fuel pressure PF is equal to a first fuel pressure PF1, a second fuel pressure PF2, and a third fuel pressure PF3. The fuel pressures PF1, PF2, and PF3 satisfy the relationship of the equation (1) shown below. The second fuel pressure PF2 is about three times of the first fuel pressure PF1 (PF2≈3×PF1), and the third fuel pressure PF3 is about five times of the first fuel pressure PF1 (PF2≈5×PF1).

$$PF1 < PF2 < PF3 \quad (1)$$

As shown in FIG. 7, the maximum reachable distance DSTMAX changes a very little if the fuel pressure changes, and decreases as the fuel injection time period TI decreases. According to the relationships shown in FIG. 7, it is confirmed that by performing the three-divided injections before completion of the warming-up of the engine 1 to shorten the time period of one injection, the maximum reachable distance DSTMAX of the injected fuel decreases, thereby making it possible to reduce the amount of fuel adhered to the piston top surface.

Figure 8A:
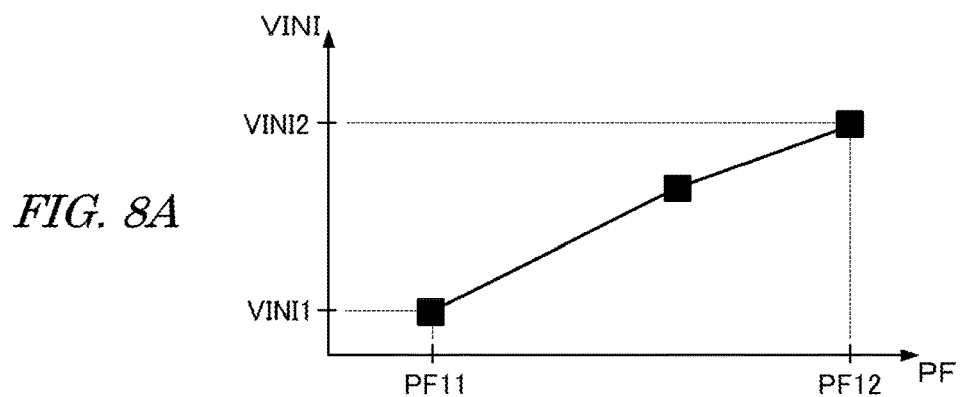
FIGS. 8A and 8B respectively show a relationship between a fuel pressure (PF) and a initial velocity (VINI) of the injected fuel, and a relationship between the fuel pressure (PF) and an atom diameter (DF) of the injected fuel.
Figure 8B:
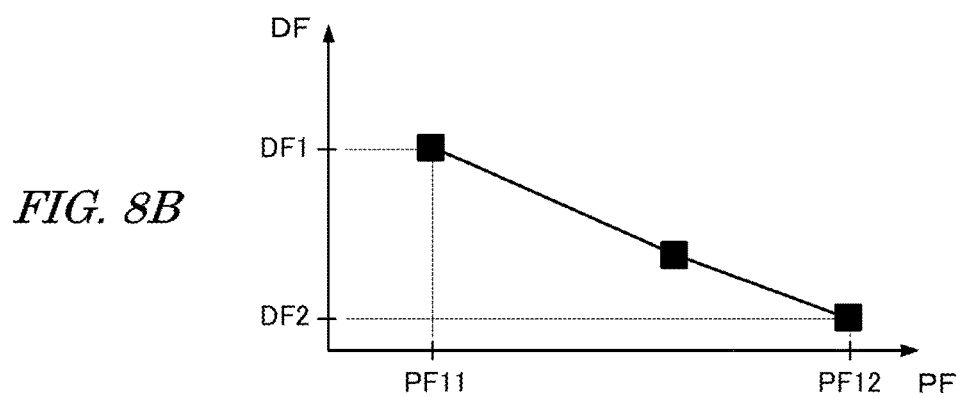

FIG. 8A shows a relationship between the fuel pressure PF and an initial velocity VINI of the injected fuel, and FIG. 8B shows a relationship between the fuel pressure PF and an atom diameter DF of the injected fuel. Since the injected fuel is atomized, the atom diameter DF means a diameter of the atomized fuel. The fuel pressure PF12 in FIGS. 8A and 8B is equal to the third fuel pressure PF3 in FIG. 7, which is about 2.5 times of the fuel pressure PF11 (PF12=PF3≈2.5×PF11).

It is confirmed from FIG. 8A that the initial velocity VINI increases as the fuel pressure PF increases. The initial velocity VINI2 shown in FIG. 8A is about 1.2 times of the initial velocity VINI1 (VINI2≈1.2×VINI1). It is confirmed from FIG. 8B that the atom diameter DF decreases as the fuel pressure PF increases. The atom diameter DF2 is about 0.7 times of the atom diameter DF1 (DF2≈0.7×DF1).

As described above in this embodiment, before completion of the warming-up of the engine 1, the fuel pressure PF is set to the fuel pressure PF11 which is comparatively low, and the three-divided injections are performed in the predetermined angular period CA3DI of which the center is the intake stroke end BDC after generation of the tumble flow FA, that is, the fuel injection of the first injection mode is performed, thereby suppressing the fuel adhesion to the piston top surface to reduce the soot amount PM in the exhaust gases.

In the high rotational speed condition after completion of the warming-up of the engine 1, the fuel pressure PF is set to the fuel pressure PF12 which is comparatively high, and the single injection is performed in the first half of the intake stroke before generation of the tumble flow FA, that is, the fuel injection of the second injection mode is performed, thereby suppressing the fuel adhesion to the cylinder wall near the mounted position of the injector 7 to reduce the soot amount PM in the exhaust gases. Increasing the fuel pressure PF makes the initial velocity VINI of the injected fuel increase, which enables shortening the fuel injection time period to surely complete the fuel injection before generation of the tumble flow FA. When increasing the fuel pressure PF, the maximum reachable distance DSTMAX hardly increases and the atom diameter DF decreases. In addition, the temperature of the piston becomes higher after completion of the warming-up. Accordingly, the soot generation amount due to the fuel adhered to the piston top surface becomes negligible compared with the soot generation amount due to the fuel adhered to the cylinder wall near the mounted position of the injector 7.

Figure 9:
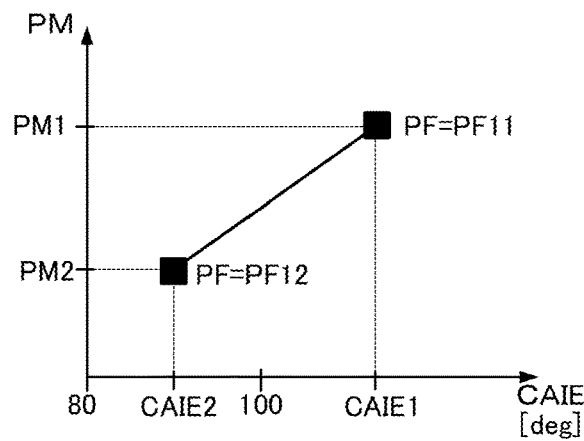
FIG. 9 shows a graph for explaining the effect of reducing the soot amount (PM) obtained by increasing the fuel pressure (PF) and advancing an end timing (CAIE) of the fuel injection.

FIG. 9 shows a graph for explaining the effect of reducing the soot amount PM, obtained by increasing the fuel pressure PF and advancing an end timing of the fuel injection in the high rotational speed condition after completion of the warming-up. In FIG. 9, PM1 is a soot amount corresponding to the case where the fuel pressure PF is set to PF11 shown in FIGS. 8A and 8B and the end timing CAIE of the fuel injection is set to CAIE1 (ATDC 113 deg.), while PM2 is a soot amount corresponding to the case where the fuel pressure PF is set to PF12 shown in FIGS. 8A and 8B and the end timing CAW of the fuel injection is set to CAIE2 (ATDC 90 deg.). The soot amount PM2 is equal to a value of about 45% less than the soot amount PM1, which indicates the reducing effect of the soot amount PM.

As described above in this embodiment, before completion of the warming-up of the engine 1, the fuel injection of the first injection mode is performed, wherein the fuel injection by the injector 7 is completed after generation of the tumble flow FA. On the other hand, after completion of the warming-up of the engine 1, the fuel injection of the second injection mode is performed, wherein the fuel injection by the injector 7 is completed before generation of the tumble flow FA. Before completion of the warming-up, fuel adhesion to the piston top surface is the main factor for generating soot. Accordingly, employing the first injection mode makes it possible to reduce an amount of fuel adhered to the piston top surface, thereby effectively suppressing the generation of soot.

After completion of the warming-up, fuel adhesion to the cylinder wall near the mounted position of the injector 7 is the main factor for generating soot. Accordingly, employing the second injection mode makes it possible to reduce an amount of fuel adhered to the cylinder wall near the injector-mounted position, thereby effectively suppressing the generation of soot. Consequently, an amount of soot contained in the exhaust gases can effectively be reduced not only before completion of the warming-up but also after completion of the warming-up.

More specifically, the second injection mode is employed after completion of the warming-up and in the high rotational speed operating condition where the engine rotational speed NE is equal to or higher than the second rotational speed NE2. In the high rotational speed operating condition, strength (flow rate) of the tumble flow FA becomes higher. Accordingly, employing the second injection mode makes it possible to obtain good effect for reducing the soot amount.

Further, the fuel injection of the first injection mode is performed as the three-divided injections within the predetermined angular period CA3DI of which the center is the intake stroke end BDC, i.e., the timing at which the piston is located at the remotest position from the injector 7. The three-divided injections reduces the penetration (maximum reachable distance) of the injected fuel, and by performing the three-divided injections within the predetermined angular period CA3DI of which the center is the intake stroke end BDC, an amount of fuel adhered to the piston top surface can be suppressed to effectively reduce the soot amount. Further, performing the three-divided injections makes it possible to homogenize the air-fuel mixture to enhance combustion stability.

Further, the fuel pressure PF in the first injection mode is set to a pressure which is lower than the fuel pressure in the second injection mode, which makes it possible to effectively reduce the penetration of the injected fuel as well as to expand the engine operating region where the three-divided injections can be performed, toward the low load side.

Further, the fuel injection of the second injection mode is a single injection, that is, the fuel injection number NINJ is set to "1". According to this setting, the fuel injection can surely be completed before generation of the tumble flow FA, to effectively reduce an amount of fuel adhered to the cylinder wall near the injector-mounted position.

The present invention is not limited to the embodiment described above, and various modifications may be made. For example, in the above-described embodiment, the direct fuel injection internal combustion engine having four cylinders is shown. The present invention is applicable to the direct fuel injection internal combustion engine having any number of cylinders. Further, if the present invention is applied to an engine provided with a turbocharger, remarkable effect can be obtained, since the strength of the tumble flow FA becomes higher in the engine provided with the turbocharger. However, the present invention is applicable to the engine with no turbocharger but is configured so that the tumble flow of comparatively high strength is generated.

What is claimed is:

1. A direct fuel injection internal combustion engine which has an injector for directly injecting fuel into a combustion chamber thereof, and is configured so that a tumble flow is generated in said combustion chamber,
   wherein fuel injection by said injector can be performed in a first injection mode and a second injection mode, the first injection mode being a mode in which the fuel injection is completed after the tumble flow is generated, and the second injection mode being a mode in which the fuel injection is completed before the tumble flow is generated,
   wherein the fuel injection of the first injection mode is performed before completion of the warming-up of said engine, and the fuel injection of the second injection mode is performed after completion of the warming-up of said engine.

2. The direct fuel injection internal combustion engine according to claim 1, wherein the fuel injection of the second injection mode is performed after completion of the warming-up of said engine and in a high rotational speed operating condition where the rotational speed of said engine is comparatively high.

3. The direct fuel injection internal combustion engine according to claim 1, wherein the fuel injection of the first injection mode comprises three-divided injections which are performed within a predetermined angular period of which the center is the bottom dead center at which the intake stroke ends.

4. The direct fuel injection internal combustion engine according to claim 2, wherein the fuel injection of the first injection mode comprises three-divided injections which are performed within a predetermined angular period of which the center is the bottom dead center at which the intake stroke ends.

5. The direct fuel injection internal combustion engine according to claim 1, wherein a pressure of fuel supplied to said injector in the first injection mode is lower than a pressure of the fuel in the second injection mode.

6. The direct fuel injection internal combustion engine according to claim 2, wherein a pressure of fuel supplied to said injector in the first injection mode is lower than a pressure of the fuel in the second injection mode.

7. The direct fuel injection internal combustion engine according to claim 3, wherein a pressure of fuel supplied to said injector in the first injection mode is lower than a pressure of the fuel in the second injection mode.

8. The direct fuel injection internal combustion engine according to claim 4, wherein a pressure of fuel supplied to said injector in the first injection mode is lower than a pressure of the fuel in the second injection mode.

9. The direct fuel injection internal combustion engine according to claim 1, wherein the fuel injection of the second injection mode is a single injection.

10. The direct fuel injection internal combustion engine according to claim 2, wherein the fuel injection of the second injection mode is a single injection.

11. The direct fuel injection internal combustion engine according to claim 3, wherein the fuel injection of the second injection mode is a single injection.

12. The direct fuel injection internal combustion engine according to claim 4, wherein the fuel injection of the second injection mode is a single injection.

13. The direct fuel injection internal combustion engine according to claim 5, wherein the fuel injection of the second injection mode is a single injection.

14. The direct fuel injection internal combustion engine according to claim 6, wherein the fuel injection of the second injection mode is a single injection.

15. The direct fuel injection internal combustion engine according to claim 7, wherein the fuel injection of the second injection mode is a single injection.

16. The direct fuel injection internal combustion engine according to claim 8, wherein the fuel injection of the second injection mode is a single injection.

* * * * *